United States Patent [19]
Becker

[11] Patent Number: 5,815,330
[45] Date of Patent: Sep. 29, 1998

[54] RADIATION LIMITER AND OPTICAL SYSTEM INCORPORATING THE SAME

[75] Inventor: Roger Jackson Becker, Kettering, Ohio

[73] Assignee: The University of Dayton, Dayton, Ohio

[21] Appl. No.: 893,838

[22] Filed: Jul. 11, 1997

Related U.S. Application Data

[60] Provisional application No. 60/021,613 Jul. 12, 1996.
[51] Int. Cl.[6] ..................................................... G02B 5/24
[52] U.S. Cl. ........................ 359/886; 359/296; 359/289; 118/726; 356/336
[58] Field of Search ................................. 359/289, 296, 359/580, 586, 886, 890; 118/726; 356/336

[56] References Cited

U.S. PATENT DOCUMENTS

| | | | |
|---|---|---|---|
| 4,536,061 | 8/1985 | Nishimura | 359/289 |
| 4,632,517 | 12/1986 | Asher | 359/296 |
| 4,890,075 | 12/1989 | Pohlmann et al. | 359/886 |
| 5,382,985 | 1/1995 | Becker et al. | 359/289 |
| 5,448,382 | 9/1995 | Land et al. | 349/14 |
| 5,576,827 | 11/1996 | Strickland et al. | 356/336 |
| 5,622,567 | 4/1997 | Kojima et al. | 118/726 |

OTHER PUBLICATIONS

"Thermorefractive Optical Limiting" by Roger Becker, May 19, 1997.
"Thermorefractive Optical Limiters" by Roger Becker, May, 1997.
"Surface Processing Techniques For Fiber Optic Array For the MAC Night Hardening Program" by Roger Becker, Sep., 1995.

*Primary Examiner*—Loha Ben
*Attorney, Agent, or Firm*—Killworth, Gottman, Hagan & Schaeff, L.L.P.

[57] ABSTRACT

An optical system is provided comprising an entry window, an exit window, a radiation transmissive membrane, and first and second lenses. The entry window and the exit window define a radiation path extending from the entry window to the exit window. The radiation transmissive membrane is positioned along the radiation path between the entry window and the exit window. The membrane defines a first chamber between the entry window and the membrane and a second chamber between the membrane and the exit window. The first fluid is included within the first chamber so as to intersect the radiation path and the second fluid is included within the second chamber so as to intersect the radiation path. The first lens operative to focus radiation directed through the entry window at a focal point located within the second fluid. The second lens is operative to focus radiation passing through the exit window.

19 Claims, 1 Drawing Sheet

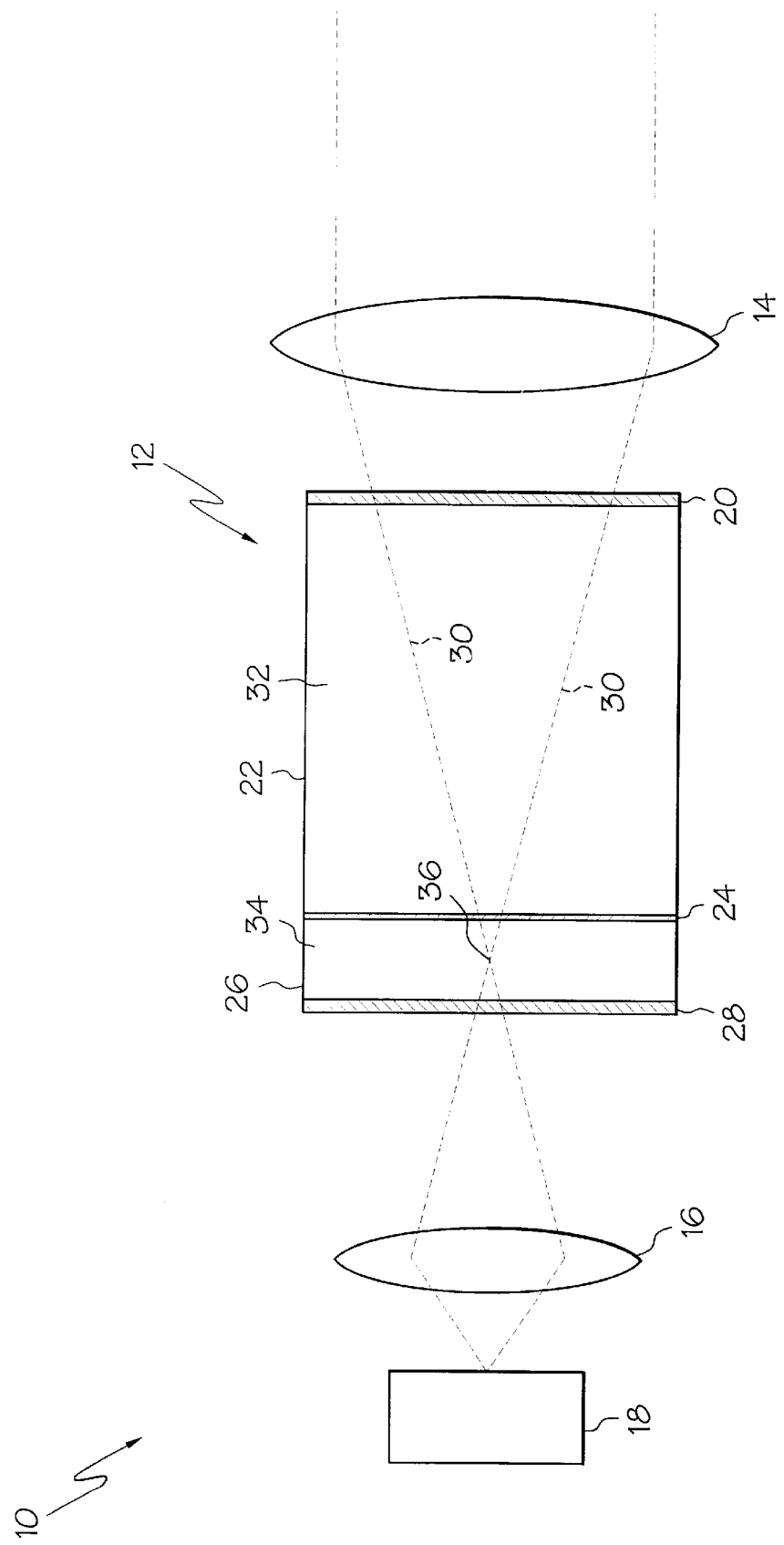

RADIATION LIMITER AND OPTICAL SYSTEM INCORPORATING THE SAME

CROSS REFERENCE TO RELATED APPLICATIONS

This application claims the benefit of U.S. Provisional Application No. 60/021,613, filed Jul. 12, 1996.

BACKGROUND OF THE INVENTION

The present invention relates to radiation limiters and, in particular, to a radiation limiter incorporating a dual chamber design and a flexible and resilient membrane provided between the two chambers.

U.S. Pat. No. 4,890,075 to Pohlmann et al., the disclosure of which is incorporated herein by reference, teaches an optical radiation limiter comprising a single optical cell. The cell contains a fluid with small radiation absorbing particles uniformly suspended in the fluid. The device is substantially transparent to incident radiation below a predetermined threshold level, but for radiation with an intensity above the threshold, the device limits the amount of radiation passed.

The present inventor has found that the conventional single optical cell operates most effectively when a relatively high density of radiation absorbing particles is provided in the cell. At the same time, the total amount of radiation particles in the cell must be minimized because the cell will not transmit a sufficient amount of radiation if a large quantity of radiation absorbing particles are provided in the cell. However, minimizing the amount of absorbing particles in the single optical cell is problematic because the cell must be as large as possible to ensure that the entry window of the single cell is sufficiently displaced from the relatively high intensity focal point of the incident radiation. If the entry window is too close to the focal point of the incident radiation, the entry window is likely to be damaged by the incident radiation.

Thus, according to the findings of the present inventor, a trade off must be made between the need for high particle density, low total particle content, and cell volume. For example, if size of the cell is increased to avoid window shattering, the total particle content must also be increased to maintain an optimum particle density. The increase in the total number of particles is not desirable, however, because this reduces cell transmission. Accordingly, there is a need for a radiation limiter that obviates the necessity for the trade off between the need for high particle density, low total particle content, and cell volume.

The conventional single cell design of U.S. Pat. No. 4,890,075 is problematic even if radiation absorbing particles are not present in the large single active cell. Specifically, because the size of the single cell must be great, a large amount of active optical fluid is needed to occupy the interior of the cell. Accordingly, there is a need for a radiation limiter which does not require a large volume of active optical fluid.

BRIEF SUMMARY OF THE INVENTION

These needs are met by the present invention wherein an optical system incorporating a dual chamber radiation limiter cell is provided. The two chambers are separated by a membrane. The second chamber functions as an active optical cell by selectively blocking the transmission of radiation above a threshold intensity level and, in one embodiment of the present invention, includes an optimally dense distribution of radiation absorbing particles. According to one aspect of the present invention, the quantity of radiation absorbing particles is minimized by providing the first and second chambers to eliminate the need for a large active optical cell.

In accordance with one embodiment of the present invention, a radiation limiter is provided comprising an entry window, an exit window, and a radiation transmissive membrane. The entry window and the exit window define a radiation path extending from the entry window to the exit window. The radiation transmissive membrane is positioned along the radiation path between the entry window and the exit window. The membrane defines a first chamber between the entry window and the membrane and a second chamber between the membrane and the exit window. A first fluid is included within the first chamber so as to intersect the radiation path and a second fluid is included within the second chamber so as to intersect the radiation path.

The radiation transmissive membrane may comprise a polymeric film having a thickness selected from the range of about 25 $\mu$m to about 150 $\mu$m. The radiation transmissive membrane may comprise a partially fluorinated polymer of a polymer selected from the group consisting of polyethylene, polyphenylene, polyimide, captan (N-trichloromethylmercapto-tetrahydrophthalimide), fluorinated captan, and polycarbonate plastic.

The first fluid may comprise a volatile liquid, a fluorocarbon, or may be selected from the group consisting of trichlorofluoromethane, 1,2-dichloro-1,1,2,2-tetrafluoroethane, FC-72, and dimethylbutene. The second fluid is preferably characterized by non-linear transmittance of radiation as a function of the intensity of the radiation and may comprise a plurality of radiation absorbing particles distributed throughout a fluid matrix. The second fluid may alternatively comprise a solution of non-linear absorbing molecules, i.e., a reverse saturable absorber solution. Preferably, the components of the second fluid, and their relative proportions, are selected such that the second chamber is about 20% to about 80% radiation transmissive.

In accordance with another embodiment of the present invention, a dual chamber radiation limiter cell is provided comprising: a first chamber containing a first fluid; a second chamber containing a second fluid; a radiation transmissive membrane positioned between the first and second chambers; and a radiation path extending through the first chamber, the radiation transmissive membrane, and the second chamber. The first chamber is operative to transmit a radiation signal characterized by a given intensity traveling along the radiation path. The second chamber is operative to transmit a major intensity portion of the radiation signal where the given intensity is below a threshold intensity value. The second chamber is operative to transmit a minor intensity portion of the radiation signal where the given intensity is above a threshold intensity value. Preferably, the radiation transmissive membrane is operative to physically separate the first fluid and the second fluid and the membrane is operative to flex in response to a shock wave generated in the second chamber.

In accordance with yet another embodiment of the present invention, an optical system is provided comprising: an entry window, an exit window, a radiation transmissive membrane, and first and second lenses. The entry window and the exit window define a radiation path extending from the entry window to the exit window. The radiation transmissive membrane is positioned along the radiation path between the entry window and the exit window. The membrane defines a first chamber between the entry window and the membrane and a second chamber between the membrane and the exit window. The first fluid is included within the first chamber so as to intersect the radiation path and the second fluid is included within the second chamber so as to intersect the radiation path. The first lens operative to focus radiation directed through the entry window at a focal point located within the second fluid. The second lens is operative to focus radiation passing through the exit window.

Accordingly, it is an object of the present invention to provide an optical system incorporating a dual chamber radiation limiter cell, wherein the necessity for the trade off between the need for high radiation absorbing particle density, low total absorbing particle content, and cell volume is obviated.

BRIEF DESCRIPTION OF THE DRAWING

The FIGURE is a schematic illustration of an optical system and radiation limiter according to the present invention.

DETAILED DESCRIPTION OF THE PREFERRED EMBODIMENTS

An optical system 10 according to the present invention is illustrated in the FIGURE. The optical system 10 comprises a radiation limiter 12, a first lens 14, a second lens 16, and a radiation detector 18. The radiation limiter comprises an entry 20, a first chamber 22, a radiation transmissive membrane 24, a second chamber 26, and an exit window 28. For the purposes of defining and describing the present invention, it should be understood that the term "window", as referenced herein, includes any radiation transmissive member, e.g., a lens, a lens array, a compound lens, a complex lens, a transparent pane of glass, an optical fiber, an array of optical fibers, an entry aperture of an optical power limiter or a optical detector, etc. Further, the term "radiation" refers to the complete electromagnetic spectrum, including, but not limited to, the visible, infrared, and ultraviolet bands.

The entry window 20 and the exit window 28 define a radiation path 30 extending from the entry window 20 to the exit window 28. It is contemplated by the present invention that the radiation path 30 illustrated in the FIGURE is merely one example of a plurality of different types of radiation paths which may extend between the entry window 20 and the exit window 28. For example, an alternative radiation path 30 may be displaced from the center axis of the radiation limiter 12 and may converge less rapidly than the path 30 illustrated in the FIGURE.

The first chamber 22 includes a first fluid 32 and is operative to transmit a radiation signal of a given intensity traveling along the radiation path 30. The second chamber 26 includes a second fluid 34 and is operative to transmit a major intensity portion of the radiation signal where the given intensity is below a threshold intensity value and transmit a minor intensity portion of the radiation signal where the given intensity is above a threshold intensity value. Specifically, the threshold intensity value of the second chamber 26 is defined by the point at which the radiation signal causes a significant change in the transmissive characteristics of the second fluid 34. The change in transmittance may be a result of: molecules in a reverse saturable absorber solution reaching their saturation point; radiation absorbing particles suspended within the second fluid 34 reaching their vaporization point; the formation of a plasma within the second fluid 34; and/or the formation of gas bubbles within the second fluid 34. Thus, the radiation limiter 12 effectively blocks transmission of high intensity signals. As will be appreciated by those skilled in the art, the threshold intensity value is a function of the particular specifications of the components selected for the radiation limiter. The selection of these components, in light of the disclosure contained herein and in light of the teachings of the prior art, is within the control of those skilled in the art.

The radiation transmissive membrane 24 is positioned along the radiation path 30 between the entry window 20 and the exit window 28. The membrane 24 and the entry window 20 define the first chamber 22 between the entry window 20 and the membrane 24. Similarly, the membrane 24 and the exit window 28 define the second chamber 26 between the membrane 24 and the exit window 28. The first fluid 32 is included within the first chamber 22 so as to intersect the radiation path 30. The second fluid 34 is included within the second chamber 26 so as to intersect the radiation path 30. The radiation transmissive membrane is operative to physically separate the first fluid 32 and the second fluid 34 and flexes in response to shock waves generated in the first chamber 22 and/or the second chamber 26.

The radiation transmissive membrane 24 comprises a polymeric film having a thickness selected from the range of about 25 $\mu$m to about 150 $\mu$m. According to one embodiment of the present invention, for example, the radiation transmissive membrane 24 comprises a polymeric film selected from the group consisting of polyethylene, polyphenylene, polyamide, captan, fluorinated captan, and polycarbonate plastic. To minimize damage to the membrane 24 upon irradiation of the limiter 12, according to one embodiment of the present invention, the radiation transmissive membrane 24 comprises a partially fluorinated polymer or another polymer with a large ionization potential.

The first chamber 22 is sized such that the entry window 20 is sufficiently displaced from the focal point 36 of the radiation path 30. In this manner, the radiation signal passing through the first window 20 is distributed over a relatively large area and is less likely to damage the entry window 20. In contrast, the radiation transmissive membrane 24 is positioned relatively close to the focal point 36. However, as indicated above the membrane 24 is designed such that it is less likely to be damaged by the high intensity radiation.

According to one embodiment of the present invention, the cross sectional area of the first chamber 22 is about the same as the surface area of the membrane 24 and entry window 20. The width of the first chamber 22 along the radiation path 30 is selected from the range of about 2 mm to about 10 mm while the width of the second chamber along the radiation path is preferably selected from the range of about 200 $\mu$m to about 500 $\mu$m. However, it is contemplated by the present invention that the each of these widths may be varied according to the specific requirements of those practicing the present invention. For example, the width of the first chamber may exceed 1 cm.

The first fluid 32 comprises a fluid which is substantially transparent to the particular incident radiation to be detected at the radiation detector 18. Further, to enhance cooling of the membrane 24 and the window 20, the first fluid 32 may comprise a volatile liquid, i.e., a liquid that boils easily, particularly when positioned to intersect the radiation path 30. The fluid motion generated when the volatile liquid boils acts to enhance the dissipation of heat at localized hot spots on the entry window 20 and the membrane 24. For example, the first fluid 32 may comprise a fluorocarbon or a fluid selected from the group consisting of trichlorofluoromethane, 1,2-dichloro-1,1,2,2-tetrafluoroethane, FC-72, and dimethylbutene.

The width of the second chamber along the radiation path is selected from the range of about 200 μm to about 500 μm. According to one embodiment of the present invention: the width of the second chamber along the radiation path is about 400 μm.

The second fluid 34 is selected such that it is characterized by non-linear transmittance of radiation as a function of the intensity of the radiation. Where the second fluid 34 comprises a suspension of radiation absorbing particles within a fluid matrix, known mechanisms for limiting transmittance as a function of intensity include laser-induced plasma formation and vaporization of some of the radiation absorbing particles. Where the second fluid 34 comprises a solution of non-linear absorbing molecules, known mechanisms for limiting transmittance as a function of intensity include laser-induced plasma formation and laser-induced saturation of molecules in the solution.

The second fluid 34 preferably comprises a compound having an ionization potential near or below about 10.5 eV, e.g., methanol (10.85 eV), ethanol (10.5 eV), benzene (9.25 eV), 4-penten-1-ol, and 1-penten-3-ol, or a boiling point between about 45° C. and about 85° C. The second fluid 34 may comprise a halogenated material. Generally, chemicals of interest are likely to have little oxygen and many carbon-carbon double bonds and/or nitrogen. Specific candidates for the second fluid 34 include mono aliphatic alcohols, aliphatic aldehydes, aliphatic ketones, aliphatic ethers, aliphatic alkenes (including butene, 2,3-dimethyl-2-butene, and isoprene), dienes, sulfides, amines, cyclo pentenes, aromatics, aromatic alcohols, an unsaturated long chain oil in solution with a butene, a pentene, or a hexadiene, 1-phenylnapthalene, 2-pentanone, propanol, butanol, n-butyl methyl ether, 1,2 dimethoxy ethane, dipropyl ether, 1-methyl cyclopentene, 3-methyl cyclopentene, propel amine, diethel amine, s-butylamine, and isobutyl amine. Porphyrins and phthalocyanines are well suited where the second fluid 34 is to comprise a solution of non-linear absorbing molecules. The second fluid 34 may contain a volatile liquid, e.g., about 30% volatile, to promote bubble formation.

The second fluid 34 may further comprise a plurality of radiation absorbing particles distributed throughout a fluid matrix selected so as to support the particles therein. Long chains of carbon double bonds terminated by carboxyl acid groups (COOH) are benign oils, e.g., $CH_3(CH_2CH=CH)_6CH_2CH_2COOH$, which have a high viscosity for facilitating the maintenance of such a suspension. The radiation absorbing particles are selected from the group consisting of carbon, tungsten, and tungsten carbide. It is contemplated by the present invention that the respective compositions of the first fluid 32 and the second fluid 34 may be selected according to the specific operating criteria for the particular application of the present invention.

The first and second lenses 14 and 16 may comprise compound lenses, lense systems, or any type of lens component, depending upon the specific application of the radiation limiter 12. Similarly, the radiation detector 18 may comprise any one of a variety of detection units, e.g., an optical detector, a human eye, etc. To optimize the radiation limiting characteristic of the optical system 10, the first lens 14 is arranged such that radiation directed through the entry window 20 is focused at the focal point 36 located within the second fluid 34. The second lens 16 is operative to focus radiation passing through the exit window 28 on the detector 18.

The radiation limiter 12 of the present invention may be employed in protective eye wear for military personnel, as a protective optical element for an imaging system employing a fiber optic array, in protective goggles for persons working with pulsed lasers, or in an optical signal processing system utilizing an optical switch.

Having described the invention in detail and by reference to preferred embodiments thereof, it will be apparent that modifications and variations are possible without departing from the scope of the invention defined in the appended claims.

What is claimed is:

1. A radiation limiter comprising:
   an entry window and an exit window defining a radiation path extending from said entry window to said exit window;
   a radiation transmissive membrane positioned along said radiation path between said entry window and said exit window, said membrane defining a first chamber between said entry window and said membrane and a second chamber between said membrane and said exit window;
   a first fluid included within said first chamber so as to intersect said radiation path; and
   a second fluid included within said second chamber so as to intersect said radiation path.

2. A radiation limiter as claimed in claim 1 wherein said radiation transmissive membrane comprises a polymeric film.

3. A radiation limiter as claimed in claim 1 wherein said radiation transmissive membrane comprises a polymeric film having a thickness selected from the range of about 25 μm to about 150 μm.

4. A radiation limiter as claimed in claim 1 wherein said radiation transmissive membrane comprises a polymer selected from the group consisting of polyethylene, polyphenylene, polyamide, captan, fluorinated captan, and polycarbonate plastic.

5. A radiation limiter as claimed in claim 1 wherein said radiation transmissive membrane comprises a partially fluorinated polymer.

6. A radiation limiter as claimed in claim 1 wherein a width of said first chamber along said radiation path is selected from the range of about 2 mm to about 10 mm.

7. A radiation limiter as claimed in claim 1 wherein a width of said first chamber along said radiation path is at least about 1 cm.

8. A radiation limiter as claimed in claim 1 wherein a width of said second chamber along said radiation path is selected from the range of about 200 μm to about 500 μm.

9. A radiation limiter as claimed in claim 1 wherein a width of said second chamber along said radiation path is about 400 μm.

10. A radiation limiter as claimed in claim 1 wherein said first fluid comprises a volatile liquid.

11. A radiation limiter as claimed in claim 1 wherein said first fluid comprises a fluorocarbon.

12. A radiation limiter as claimed in claim 1 wherein said first fluid is selected from the group consisting of trichlorofluoromethane, 1,2-dichloro-1,1,2,2-tetrafluoroethane, FC-72, and dimethylbutene.

13. A radiation limiter as claimed in claim 1 wherein said second fluid is characterized by non-linear transmittance of radiation as a function of the intensity of said radiation.

14. A radiation limiter as claimed in claim 1 wherein said second fluid comprises a plurality of radiation absorbing particles suspended in a fluid matrix.

15. A radiation limiter as claimed in claim 1 wherein said second fluid comprises a solution of non-linear absorbing molecules.

16. A dual chamber radiation limiter cell comprising:

a first chamber containing a first fluid;

a second chamber containing a second fluid;

a radiation transmissive membrane positioned between said first and second chambers; and a radiation path extending through said first chamber, said radiation transmissive membrane, and said second chamber, wherein said first chamber is operative to transmit a radiation signal traveling along said radiation path, said radiation signal being characterized by a given intensity, said second chamber is operative to transmit a major intensity portion of said radiation signal where said given intensity is below a threshold intensity value, and wherein said second chamber is operative to transmit a minor intensity portion of said radiation signal where said given intensity is above a threshold intensity value.

17. A dual chamber radiation limiter as claimed in claim 16 wherein said radiation transmissive membrane is operative to physically separate said first fluid and said second fluid.

18. A dual chamber radiation limiter as claimed in claim 16 wherein said membrane is operative to flex in response to a shock wave generated in said second chamber.

19. An optical system comprising:

an entry window and an exit window defining a radiation path extending from said entry window to said exit window;

a radiation transmissive membrane positioned along said radiation path between said entry window and said exit window, said membrane defining a first chamber between said entry window and said membrane and a second chamber between said membrane and said exit window;

a first fluid included within said first chamber so as to intersect said radiation path;

a second fluid included within said second chamber so as to intersect said radiation path;

a first lens operative to focus radiation directed through said entry window at a focal point located within said second fluid;

a second lens operative to focus radiation passing through said exit window.

* * * * *